United States Patent
Yan et al.

(10) Patent No.: US 11,781,942 B2
(45) Date of Patent: Oct. 10, 2023

(54) METHOD FOR DETERMINING FLOW VELOCITY DISTRIBUTION IN ROUGHNESS SUBLAYERS

(71) Applicants: CHINA THREE GORGES CORPORATION, Beijing (CN); HOHAI UNIVERSITY, Jiangsu (CN)

(72) Inventors: Jing Yan, Jiangsu (CN); Hanqing Zhao, Beijing (CN); Hongwu Tang, Jiangsu (CN); Limo Tang, Jiangsu (CN); Xiaoli Wang, Jiangsu (CN); Jinyu Zheng, Jiangsu (CN); Yang Yu, Jiangsu (CN)

(73) Assignees: CHINA THREE GORGES CORPORATION; HOHAI UNIVERSITY

( * ) Notice: Subject to any disclaimer, the term of this patent is extended or adjusted under 35 U.S.C. 154(b) by 0 days.

(21) Appl. No.: 17/422,676

(22) PCT Filed: Dec. 30, 2020

(86) PCT No.: PCT/CN2020/141346
§ 371 (c)(1),
(2) Date: Jul. 13, 2021

(87) PCT Pub. No.: WO2021/139579
PCT Pub. Date: Jul. 15, 2021

(65) Prior Publication Data
US 2023/0015435 A1    Jan. 19, 2023

(30) Foreign Application Priority Data

Jan. 10, 2020   (CN) .......................... 202010024286.2

(51) Int. Cl.
*G01M 10/00* (2006.01)
(52) U.S. Cl.
CPC ................................. *G01M 10/00* (2013.01)
(58) Field of Classification Search
CPC ...... G01M 10/00; G01M 9/065; G01M 9/067; G01M 9/08
See application file for complete search history.

(56) References Cited

U.S. PATENT DOCUMENTS

| | | | |
|---|---|---|---|
| 6,679,105 B1 * | 1/2004 | Jepsen | G01N 33/18 73/86 |
| 2018/0003533 A1 * | 1/2018 | Rick | G01F 1/002 |

* cited by examiner

*Primary Examiner* — Paul M. West

(57) ABSTRACT

A method for determining flow velocity distribution in the roughness sublayer is provided, which uses the experimental device that includes a variable-slope circulating flume system and a flow-measuring system, the variable-slope circulating flume system is used to study flow in the roughness sublayer, and the flow-measuring system is used to measure flow velocity in each zone in the flume. In the variable-slope circulating flume, the method according to the invention uses cylindrical aluminum rods to simulate large-scale roughness elements, and the submergence, the average bulk flow velocity and the distribution density of roughness elements are changed.

3 Claims, 4 Drawing Sheets

METHOD FOR DETERMINING FLOW VELOCITY DISTRIBUTION IN ROUGHNESS SUBLAYERS

FIELD

The present invention relates to turbulence dynamics technology, in particular relates to a method for determining flow velocity distribution in the roughness sublayers.

BACKGROUND

When fluid passes over a fixed boundary, the surface resistance of boundary influences the fluid, forming the boundary shear flow. The boundary shear flow exists in the nature, such as river runoff and terrestrial air flow. The boundary surface is generally rough in natural circumstance. For example, the river bedform undulates, and the land surface is often covered with forests, grasslands and urban buildings, those cause the flow characteristics to change near the boundary. The exact zone with changing flow characteristics is called a roughness sublayer, and the sand waves on river bed and forests or buildings on the land surface are collectively called roughness elements. The thickness of the roughness sublayer is several times the size of the roughness element, and the flow within this zone has an important influence on the river bed evolution, the atmospheric pollutants transport, the wind resource utilization, and the like. Therefore it is necessary to study flow characteristics in the roughness sublayer. At present, some researches have been carried out to study the range of the roughness sublayer, not having clarified the velocity distribution in this zone.

SUMMARY

Objective of the invention is to provide a method for determining flow velocity distribution in the roughness sublayer aiming at the above-mentioned research status and deficiencies by laboratory simulation and theoretical analysis.

In order to achieve the above-mentioned objective, the invention adopts the following technical solutions:

An experimental device for studying flow in the roughness sublayers, including a variable-slope circulating flume system and a flow-measuring system, wherein the variable-slope circulating flume system is used to simulate flow in the roughness sublayer, and the flow-measuring system is used to measure the flow velocity distribution in each zone in the flume system.

Preferably, the variable-slope circulating flume system includes a variable-slope circulating flume, an inlet pipe, a tailgate and cylindrical aluminum rods. The upstream and downstream of the flume are connected to a reservoir by the inlet pipe and the tailgate, respectively, so as to realize the water circulation. The cylindrical aluminum rods are aligned along the longitudinal and spanwise directions in the middle region of the flume bottom.

Preferably, a variable-frequency pump-electromagnetic flowmeter system is also equipped onto the inlet pipe to ensure continuity and constancy of the designed incoming flow discharge Q.

Preferably, the flow-measuring system uses an Acoustic-Doppler Velocimeter (ADV) to measure the flow velocity.

The invention further provides a method for determining flow velocity distribution in the roughness sublayer by using the above-mentioned experimental devices, which includes the following steps.

(1) simulating flow in the roughness sublayer by using the variable-slope circulating flume, and dividing the roughness sublayer into two parts of a near-bottom layer and a mixing layer from bed surface to top, wherein the mixing layer is further subdivided into two regions of a penetration region and a free flow region from bottom to top, among them, the upper boundary of the roughness sublayer is $z=h_o$, that is, the roughness sublayer is $0<z<h_o$, the near-bottom layer is $0<z<h_p$, the mixing layer is $h_p<z<h_o$, the penetration region is $h_p<z<h$, and the free flow region is $h<z<h_o$; simulating roughness elements by using cylindrical aluminum rods that locate just in the near-bottom layer and the penetration region, wherein, $z=h$ is the top position of the roughness element; taking the length scale $L_c$ as thickness of the corresponding region, and taking the velocity scale $U_c$ as the difference of the flow velocities at the upper and lower boundaries, for the penetration region or the free flow region.

(2) adjusting the output of the variable-frequency pump to reach the designed flow discharge Q; adjusting the opening of the tailgate and the flume bed slope to make water depth H in the flume reach the designed value and keep longitudinally constant; finally, the flow state presenting constant and uniform, and the water depth H and the bulk velocity $U_m=Q/(BH)$ meeting the experimental requirements.

(3) aligning the roughness elements along the longitudinal and spanwise directions (that is, the x and y directions), and conducting orthogonal tests; changing distances of adjacent roughness elements along the x and y directions, i.e., Sx and Sy; adjusting the submergence H/h by changing the water depth H; adjusting $U_m$ by changing the flow discharge Q; naming each case in the manner of "$S_x$–$S_y$–H/h–$U_m$".

(4) setting the measurement cross-section downstream of the flume inlet, and arranging two vertical measurement lines I and II in the cross-section near central axis of the flume, the plane projection of the measurement line I being at the middle of two adjacent elements rows along the x direction and in the column of roughness elements along the y direction, and the plane projection of measurement line II being at the middle of two adjacent elements rows and two adjacent elements columns.

(5) setting up the Acoustic-Doppler Velocimeter (ADV) onto a three-dimensional movable coordinate frame, measuring vertically along the measurement lines I and II, respectively, and averaging the data at the same height to reflect the overall flow status, so as to get the data of flow velocity profile in the roughness sublayer.

Further, flow velocity in the roughness sublayer in step (5) obeys the following distribution law:

$$U = \begin{cases} C & 0 < z < h_p \\ \left(U_h + U_C \cdot \tanh\left(\dfrac{z-h}{L_C}\right)\right) / \tanh(1) & h_p < z < h_o \end{cases} ;$$

when $h_p<z<h$, $L_{C1}=(h_p-h)$, $U_{C1}=(U_p-U_h)$; when $h<z<h_o$, $L_{C2}=(h_o-h)$, $U_{C2}=(U_o-U_h)$; where, $U_h$, $U_o$ and $U_p$ are the flow velocities at top of the roughness elements, and the upper and lower boundaries of the mixing layer, respectively.

Compared with prior arts, the invention has the following advantages and beneficial effects:

1) The flume system can be used to effectively simulate flow in the roughness sublayer. The flow-measuring methods, including the selection of typical measurement lines and the processing of measured data, can quickly and accurately obtain overall flow velocity profile in the roughness sublayer, and provide guidance for related research.

2) Combining the theory of classic boundary shear flow and learning from study about the vegetal flow, the roughness sublayer is divided vertically. According to turbulence structures in the flow velocity distribution in each zone is studied separately. It is highly theoretical.

3) The proposed formula is suitable for describing flow velocity profiles in the roughness sublayer under different conditions. It is conducive to the refined simulation of river flow, terrestrial air flow and other complex boundary shear flow, and makes a certain foundation for studying river bed evolution, atmospheric pollutants transport and the wind resource utilization.

Figure 1:
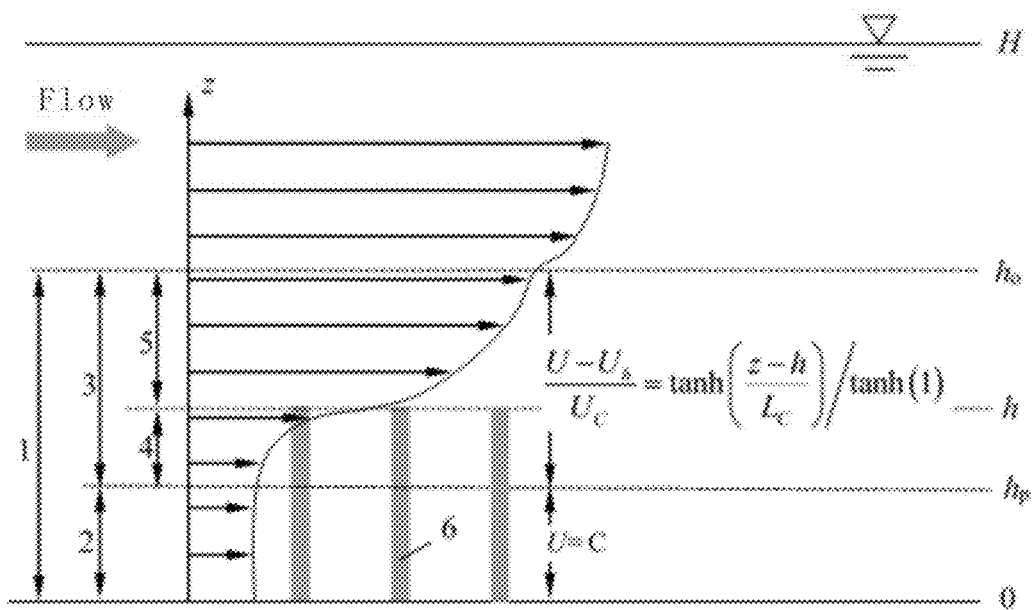
FIG. 1 is a schematic diagram of the flow subdivision and flow velocity distribution in the roughness sublayer.

where, 1—roughness sublayer, 2—near-bottom layer, 3—mixing layer, 4—penetration region, 5—free flow region, 6—roughness element.

DETAILED DESCRIPTION

The technical solution of the invention will be described in detail below with reference to the drawings and specific examples.

An experimental device for studying flow in the roughness sublayer, including a variable-slope circulating flume system and a flow-measuring system, wherein the variable-slope circulating flume system is used to simulate flow in the roughness sublayer, and the flow-measuring system is used to measure the flow velocity distribution in each zone in the flume.

The variable-slope circulating flume system is an existing technology, for example, a circulating variable-slope flume system for simulating rivers with Chinese Patent Publication No. CN203238590U was disclosed on Oct. 16, 2013. In this example, the flume system is used to simulate flow in the roughness sublayer by placing cylindrical aluminum rods into the preset holes of a plastic plate according to the experimental requirements.

The variable-slope circulating flume system includes a variable-slope circulating flume, an inlet pipe, a tailgate and cylindrical aluminum rods. The upstream and downstream of the variable-slope circulating flume are connected to a reservoir by the inlet pipe and the tailgate, respectively, so as to realize the water circulation. The cylindrical aluminum rods are aligned along the longitudinal and spanwise directions in the middle region at the flume bottom. The pump output, the tailgate opening and the flume slope can be artificially adjusted to create the constant and uniform flow state, with the water depth H and the bulk flow velocity $U_m=Q/(BH)$ reaching the experimental designed values.

The flow-measuring system uses an Acoustic-Doppler Velocimeter (ADV) to measure the flow.

A method for determining flow velocity profile in the roughness sublayer by using the above-mentioned experimental devices, which includes the following steps:

(1) simulating flow in the roughness sublayer by using the variable-slope circulating flume, and dividing the roughness sublayer into two parts of a near-bottom layer and a mixing layer from bed surface to top, wherein the mixing layer is further subdivided into two regions of a penetration region and a free flow region from bottom to top, among them, the upper boundary of the roughness sublayer is $z=h_o$, that is, the roughness sublayer is $0<z<h_o$, the near-bottom layer is $0<z<h_p$, the mixing layer is $h_p<z<h_o$, and the penetration region is $h_p<z<h$, the free flow region is $h<z<h_o$; simulating roughness elements by using cylindrical aluminum rods that are located in the near-bottom layer and the penetration region, wherein, $z=h$ is top of the roughness element; taking the length scale $L_c$ as thickness of the corresponding region, and taking the flow velocity scale $U_C$ as the difference of the flow velocities at the upper and lower boundaries, for the penetration region or the free flow region;

(2) adjusting the output of the variable-frequency pump to reach the designed flow discharge Q; adjusting the opening of the tailgate and the flume slope to make the water depth H in the flume reach the designed value and keep longitudinally constant; finally, the flow state presenting constant and uniform, and the water depth H and the bulk velocity $U_m=Q/(BH)$ meeting the experimental requirements;

(3) aligning the roughness elements along the longitudinal and spanwise directions (that is, the x and y directions), and designing orthogonal tests; adjusting the distances of adjacent roughness elements along the x and y directions, i.e., Sx and Sy; adjusting the submergence H/h by changing the water depth H; adjusting $U_m$ by changing the pump output; naming each case in the manner of "$S_x$–$S_y$–H/h–$U_m$";

(4) setting the measurement section 7m downstream of the flume inlet, and arranging two vertical measurement lines I and II in the cross section near the central axis of the flume, the plane projection of the measurement line I being at the middle of two adjacent elements rows along the x direction and in parallel with the column of roughness elements along the y direction, and the plane projection of measurement line II being at the middle of two adjacent elements rows and two adjacent elements columns;

(5) setting up the Acoustic-Doppler Velocimeter (ADV) onto a three-dimensional movable coordinate frame, measuring vertically along the measurement lines I and II, respectively, and averaging the measured data at the same height to reflect the overall flow status, so as to get the flow velocity profile in the roughness sublayer.

In this example, as shown in FIG. 1, a variable-slope circulating flume and some cylindrical aluminum rods are used to simulate flow in the roughness sublayer, and the submergence, the average bulk velocity, and the distribution density of roughness elements are changed. The flume is 12 m long, 0.6 m wide, and 0.6 m deep and has characteristics of controllable flow discharge, water depth and bed slope, so as to create a constant and uniform flow condition with designed H and $U_m$. The cylindrical aluminum rod with a height of h=6 cm and a diameter of 0.6 cm is used to simulate large-scale roughness element. The cylindrical aluminum rods are aligned along the x and y directions so that they cover the bed region (the bottom region of the flume) with a length of 8 m and a width of 0.6 m to create flow in the roughness sublayer. The distribution density of roughness elements is adjustable, by changing distances between adjacent aluminum rods (roughness elements) along the x and y directions, i.e., $S_x$ and $S_y$. During the experiment, the height h of the roughness element is kept to be unchanged, and the relative submergence H/h is adjusted by changing the water depth H. The pump output is changed and the average bulk velocity $U_m$ of the section is adjusted, so as to carry out orthogonal tests. Where $S_x$=10, 5 cm, $S_y$=8, 4, 2, 1 cm, H/h=3, 4, 5, 6, 7, $U_m$=30, 20, 10 cm/s, and each case is named in the manner of "$S_x$–$S_y$–H/h–$U_m$".

Based on the boundary shear turbulence theory, the roughness sublayer 1 ($0<z<h_o$) is divided into two parts of a near-bottom layer 2 ($0<z<h_p$) and a mixing layer 3 ($h_p<z<h_o$) from bed surface to top. The near-bottom layer manifests constant flow velocity along the vertical direction, that is, U=C, where C is a constant. The mixing layer presents S-shaped velocity profile, and the velocity is distributed in a hyperbolic tangent manner along the vertical direction, that is:

$$\frac{U - U_h}{U_C} = \tanh\left(\frac{z-h}{L_C}\right) \Big/ \tanh(1);$$

where, $U_h$ is flow velocity at top of the roughness element, h is the height of the roughness element, $U_C$ is the velocity scale, and $L_C$ is the length scale. The mixing layer 3 can be further divided into two parts of a penetration region 4 ($h_p<z<h$) and a free flow region 5 ($h<z<h_o$). We set the length scale $L_{C1}=(h_p-h)$ and velocity scale $U_{C1}=(U_p-U_h)$ in the penetration region, and the length scale $L_{C2}=(h_o-h)$ and the velocity scale $U_{C2}=(U_o-U_h)$ in the free flow region. Where, $U_o$ and $U_p$ are the flow velocities at $z=h_o$ and $z=h_p$, respectively. The method for determining flow velocity distribution in the roughness sublayer according to the invention is conducive to the refined simulation of river flow, terrestrial air flow and other complex boundary shear flow, and makes a certain foundation for studying the river bed evolution, the atmospheric pollutants transport and the wind resource utilization.

An Acoustic-Doppler Velocimeter (ADV) is used to measure flow velocity with ±1 mm/s accuracy. The sampling period is set to be 180 seconds with a frequency of 200 Hz. The measurement section is fixed 7 m downstream of the flume inlet, and two vertical measurement lines I and II are arranged in the cross section near the central axis of the flume. The plane projection of the measurement line I is at the middle of two adjacent elements rows along the x direction and in the column of roughness elements along the y direction, and the plane projection of measurement line II is located at the middle of two adjacent elements rows and two adjacent elements columns. The ADV is set up onto a three-dimensional movable coordinate frame (displacement accuracy ±0.01 mm), and takes measurements along measurement lines I and II, respectively, so as to realize the semi-automatic measurement to the flow field. For any measuring line, the ADV is moved towards the water surface and measures at a length step of 2 mm, starting from 1 mm above the bed surface. During the experiment, the data at the same height is averaged to reflect the overall flow status, so as to get flow velocity profile throughout the roughness sublayer.

Combining the boundary shear flow theory, the upper boundary of the roughness sublayer ($z=h_o$) is the critical position where the velocity distribution deviates from the logarithm law. The $h_o$ values under different conditions can thus be determined. With reference to study about submerged vegetation flow, the roughness sublayer ($0<z<h_o$) can be divided into two parts of a near-bottom layer ($0<z<h_p$) and a mixing layer ($h_p<z<h_o$) from bed surface to top, and the velocity remains vertically constant in the near-bottom layer. The boundary $z=h_p$ between the near-bottom layer and the mixing layer is the critical height at which the generation rate of shear turbulence kinetic energy is equal to its dissipation rate, and the value $h_p$ value can thus be determined.

The generation mechanism of turbulence in the mixing layer is completely consistent with the one in the classic free-shear mixing layer, where the velocity is distributed in the hyperbolic tangent pattern. Affecting by the roughness element resistance, turbulence characteristics of the former one are different from turbulence in the classic free-shear mixing layer to a certain extent, so that it is necessary to subdivide the mixing layer into a penetration region ($h_p<z<h$) and a free flow region ($h<z<h_o$) and analyze separately. Where, z=h is top of the roughness element, which is also the burst position of turbulence.

The flow resistance in the free flow region mainly derives from the flow viscosity, and flow resistance in the penetration region includes both flow viscosity and roughness element resistance. Since both the flow viscosity and the roughness element resistance distribute vertically, the water flow in the penetration region could be treated approximately as some kind of highly viscous fluid movement whose viscous force is equal to a sum of the water viscous force and the roughness element resistance. Therefore, velocity profiles in the penetration region and the free flow region meet the hyperbolic tangent distribution law, separately. We set the length scale $L_{C1}=(h_p-h)$ and velocity scale $U_{C1}=(U_p-U_h)$ in the penetration region, and the length scale $L_{C2}=(h_o-h)$ and the velocity scale $U_{C2}=(U_o-U_h)$ in the free flow region. Among them, $h_p$ is the boundary height between the near-bottom layer and the mixing layer, $h_o$ is the upper boundary of the mixing layer (that is, the upper boundary of the roughness sublayer), h is the height of the roughness element, $U_h$ is the flow velocity at top of the roughness element, $U_o$ and $U_p$ are the flow velocities at upper boundary ($z=h_o$) and lower boundary ($z=h_p$) of the mixing layer, respectively.

In summary, flow velocity in the roughness sublayer obeys the following distribution law:

$$U = \begin{cases} C & 0 < z < h_p \\ U_h + U_C \cdot \tanh\left(\dfrac{z-h}{L_C}\right) \Big/ \tanh(1) & h_p < z < h_o \end{cases} \quad (1);$$

when $h_p<z<h$, $L_{C1}=(h_p-h)$, $U_{C1}=(U_p-U_h)$; when $h<z<h_o$, $L_{C2}=(h_o-h)$, $U_{C2}=(U_o-U_h)$.

Figure 2:
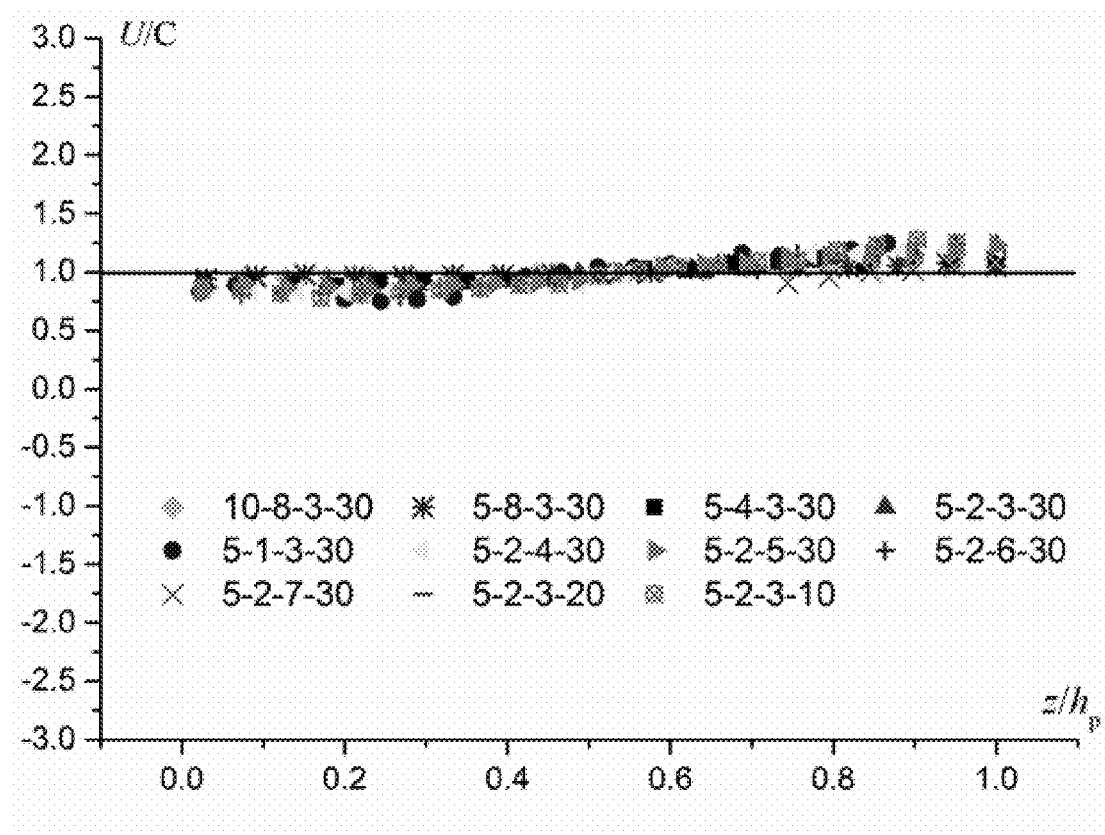
FIG. 2 is a comparison between the measured data and the formula calculated results, after the dimensionless treatment (near-bottom layer).
Figure 3:
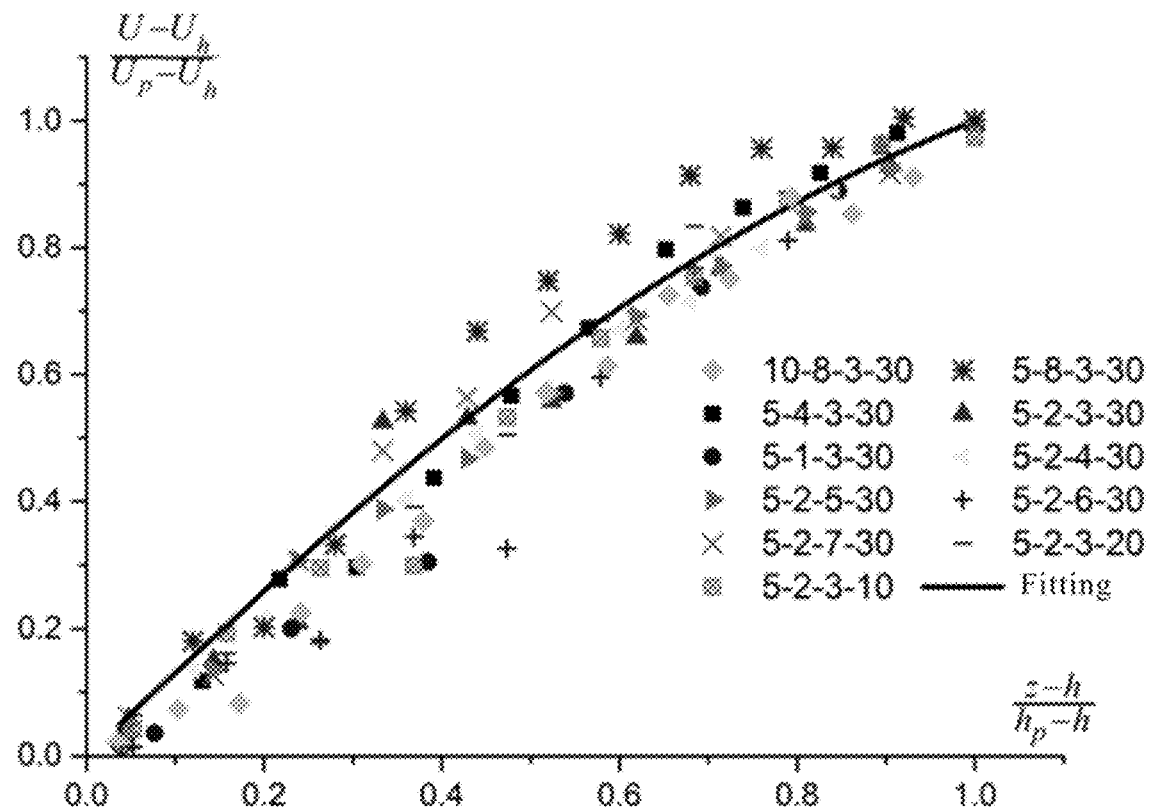
FIG. 3 is a comparison between the measured data and the formula calculated results, after the dimensionless treatment (penetration region).
Figure 4:
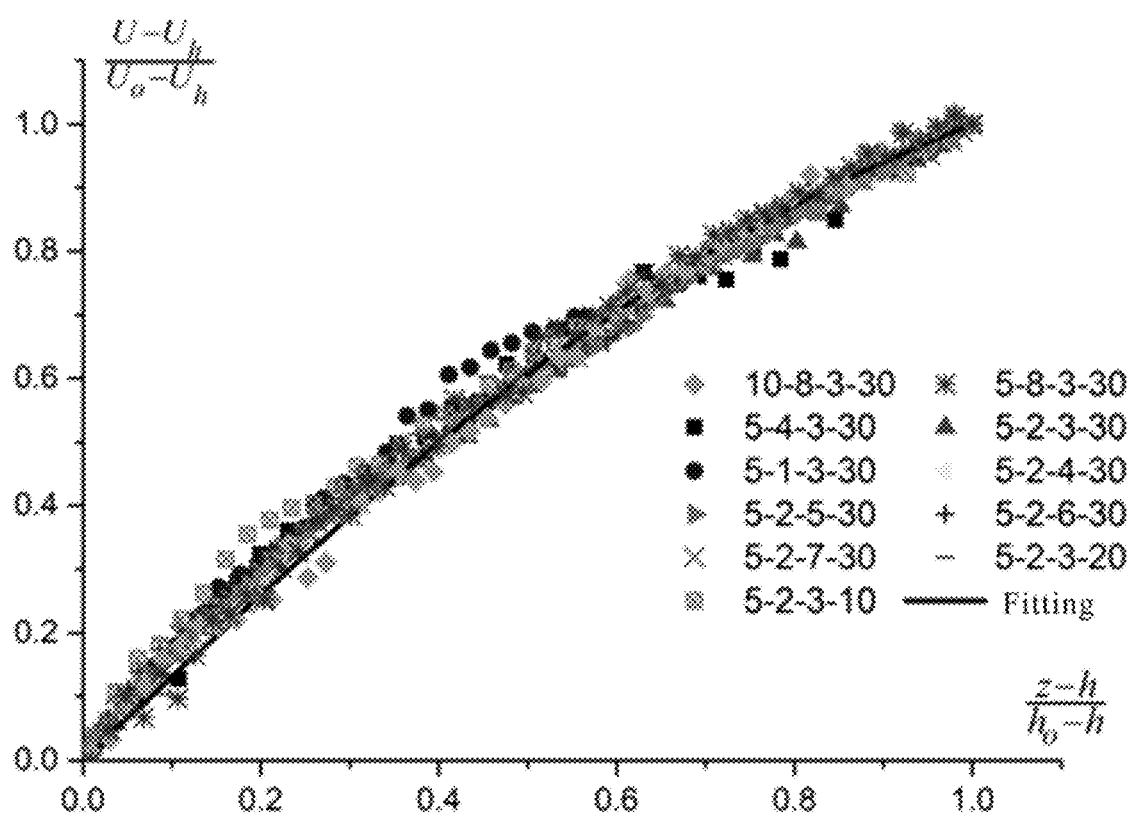
FIG. 4 is a comparison between the measured data and the formula calculated results, after the dimensionless treatment (free flow region).

FIGS. 2, 3, and 4 show non-dimensional distributions of flow velocity profiles in the near-bottom layer, the penetration region and the free flow region, respectively. It can be seen from the figures that the above formula is suitable for describing velocity profile in the roughness sublayer under conditions of arbitrary submergence H/h, bulk flow velocity $U_m$, and roughness elements.

What is claimed is:

1. A method for determining flow velocity distribution in a roughness sublayer by using an experimental device which includes a variable-slope circulating flume system and a flow-measuring system, wherein the variable-slope circulating flume system is used to simulate a flow in the roughness sublayer, and the flow-measuring system is used to measure a velocity distribution in each zone in the variable-slope circulating, flume system, comprising the following steps:

(1) simulating the flow in the roughness sublayer by using the variable-slope circulating flume, and dividing the roughness sublayer into two parts of a near-bottom layer and a mixing layer from bed surface to top, wherein the mixing layer is further subdivided into two regions of a penetration region and a free flow region from bottom to top, an upper boundary of the roughness sublayer is $z=h_o$, that is, the roughness sublayer is $0<z<h_o$, the near-bottom layer is $0<z<h_p$, the mixing layer is $h_p<z<h_o$, and the penetration region is $h_p<z<h$, the free flow region is $h<z<h_o$, where h is a height of a rough element, and $h_p$ is a boundary height between the near-bottom layer and the mixing layer; simulating roughness elements by using cylindrical aluminum rods that are located in the near-bottom layer and the penetration region, wherein z=h is a top of the roughness element;

(2) adjusting an output of a variable-frequency pump to reach a designed flow discharge Q; adjusting an opening of a tailgate and a flume slope to make a water depth H in the flume reach a designed value and to keep longitudinally constant, so that finally the flow presents a state of constant and uniform, and the water depth H and a bulk velocity $u_m=Q/(BH)$ reach preset values;

(3) aligning the roughness elements along a flowing direction, which is x direction, and a spanwise direction which is y direction, and changing distances of adjacent roughness elements along the ,x and y directions Sx and Sy; adjusting a submergence H/h by changing the water depth H; adjusting $U_m$ by changing the pump output; naming each case in a manner of "$S_x$-$S_y$H/h-$U_m$";

(4) setting a measurement section at a place of 7 m downstream of a flume inlet, and arranging two vertical measurement lines I and II in the cross section near a central axis of the flume, a plane projection of the measurement line I being at a middle of two adjacent roughness elements rows along the x direction and in parallel with roughness elements columns along the y direction, and a plane projection of measurement line II being, at a middle of two adjacent roughness elements rows and two adjacent roughness elements columns;

(5) setting up ADV onto a three-dimensional movable coordinate frame, making measurements with the ADV along the measurement lines I and II, respectively, and averaging data at a same height to reflect a overall flow status, so as to get a flow velocity profile in the roughness sublayer.

2. The method for determining the flow velocity distribution in the roughness sublayer according to claim 1, wherein, the variable-slope circulating flume system includes a variable-slope circulating flume, an inlet pipe, a tailgate and cylindrical aluminum rods, an upstream and a downstream of the variable-slope circulating flume are connected to a reservoir by the inlet pipe and the tailgate, respectively, so as to realize water circulation, the cylindrical aluminum rods are aligned along the longitudinal and spanwise directions in the middle region at the flume bottom.

3. The method for determining the flow velocity distribution in the roughness sublayer according to claim 2, wherein, a variable-frequency pump-electromagnetic flowmeter system is also provided on the inlet pipe to ensure continuity and constancy of a designed incoming flow discharge Q.

\* \* \* \* \*